United States Patent
Yu et al.

(10) Patent No.: US 9,461,404 B2
(45) Date of Patent: Oct. 4, 2016

(54) CONNECTOR

(71) Applicant: Formerica OptoElectronics Inc., Hsinchu County (TW)

(72) Inventors: Tung-Yi Yu, Hsinchu County (TW); Sheng-Wei Wu, Hsinchu County (TW)

(73) Assignee: FORMERICA OPTOELECTRONICS INC., Hsinchu County (TW)

( * ) Notice: Subject to any disclaimer, the term of this patent is extended or adjusted under 35 U.S.C. 154(b) by 0 days.

(21) Appl. No.: 14/489,955

(22) Filed: Sep. 18, 2014

(65) Prior Publication Data

US 2015/0093078 A1  Apr. 2, 2015

(30) Foreign Application Priority Data

Sep. 27, 2013 (TW) .............................. 102135225 A

(51) Int. Cl.
| | |
|---|---|
| G02B 6/36 | (2006.01) |
| H01R 4/50 | (2006.01) |
| H01R 13/625 | (2006.01) |
| H01R 13/627 | (2006.01) |
| H01R 13/629 | (2006.01) |
| G02B 6/42 | (2006.01) |

(52) U.S. Cl.
CPC ........... *H01R 13/627* (2013.01); *G02B 6/4284* (2013.01); *H01R 13/6271* (2013.01); *H01R 13/6272* (2013.01); *H01R 13/6275* (2013.01); *H01R 13/62933* (2013.01); *G02B 6/428* (2013.01); *Y10T 403/595* (2015.01)

(58) Field of Classification Search
CPC .......... H01R 13/6275; H01R 13/6271; H01R 13/6272; H01R 13/62933; H01R 13/627; G02B 6/3807; G02B 6/4284

USPC ...... 385/76, 77, 88, 92; 439/13, 29, 31, 133, 439/304, 345, 346, 350, 352, 353, 354, 357, 439/358, 370

See application file for complete search history.

(56) References Cited

U.S. PATENT DOCUMENTS

| | | | | |
|---|---|---|---|---|
| 3,523,269 | A * | 8/1970 | Bissland et al. | 439/358 |
| 5,154,629 | A * | 10/1992 | Carver et al. | 439/352 |
| 5,197,900 | A * | 3/1993 | Ellis et al. | 439/352 |
| 5,454,726 | A * | 10/1995 | Lee et al. | 439/65 |
| 6,217,364 | B1 * | 4/2001 | Miskin et al. | 439/358 |
| 6,827,594 | B1 * | 12/2004 | Davis et al. | 439/157 |
| 7,163,412 | B2 * | 1/2007 | Fan et al. | 439/258 |
| 7,281,937 | B2 * | 10/2007 | Reed | H01R 13/6275 439/352 |
| 9,337,579 | B2 * | 5/2016 | Zhu | H01R 13/6275 |
| 2007/0049099 | A1 * | 3/2007 | Potters | 439/352 |
| 2009/0226140 | A1 * | 9/2009 | Belenkiy | G02B 6/3898 385/134 |
| 2011/0294333 | A1 * | 12/2011 | Wu | H01R 13/6335 439/345 |
| 2012/0282790 | A1 * | 11/2012 | Wang | H01R 13/6335 439/153 |
| 2013/0005173 | A1 * | 1/2013 | Reed | H01R 9/038 439/350 |

(Continued)

*Primary Examiner* — Robert Tavlykaev
(74) *Attorney, Agent, or Firm* — Chun-Ming Shih

(57) ABSTRACT

A connector is provided, including a connector body, a fastener and an elastomer. The fastener is pivoted on the connector body with a hook end and a press end positioned on both sides thereof, respectively. The two ends of the elastomer contact the connector body and the press end of the fastener, respectively. The connector of the invention may accomplish plugging and unplugging of an electronic equipment in a single hand press way without bracer arrangement by a configuration of the press end, and may maintain an engagement state between the hook end and the electronic equipment with an arrangement of the elastomer.

11 Claims, 5 Drawing Sheets

(56) References Cited

U.S. PATENT DOCUMENTS

| | | | |
|---|---|---|---|
| 2013/0216188 A1* | 8/2013 | Lin et al. | 385/77 |
| 2013/0322832 A1* | 12/2013 | Wang et al. | 385/92 |
| 2013/0323949 A1* | 12/2013 | De Dios Martin | H01R 13/6272 439/160 |
| 2016/0149341 A1* | 5/2016 | Reed | H01R 13/6275 439/352 |

* cited by examiner

CONNECTOR

CROSS-REFERENCE TO RELATED APPLICATIONS

This application claims the priority of Republic of China Patent Application No. 102135225 filed on Sep. 27, 2013, in the State Intellectual Property Office of the R.O.C., the disclosure of which is incorporated herein by reference.

BACKGROUND OF THE INVENTION

1. Field of the Invention

The invention relates to a connector, and more specifically, a connector capable of plugging and unplugging with a single hand.

2. Descriptions of the Related Art

Accordingly, connectors for electrical connection of various electronic equipment and other peripheral equipment trend to miniaturization with advanced volume of industrial technology, in order for various inserted light, thin and small electronic equipment to perform signal transmission. However, structural strength is weakened as volume of connectors is reduced. As a force exerted by a user is not appropriate, the connector may be damaged easily or the stability of signal transmission would be poor.

Moreover, a hook of a connector is usually formed on one end inserted with an electronic equipment to engage a slot pre-formed on the electronic equipment, and thereby the insertion relationship between the connector and the electronic equipment is maintained. Generally, the hook of the above connector would be formed on an elastic plate, and a bracer with a bump is formed on a clamping end side below the elastic plate. The bracer may be forced and drawn to move for the bump to oppress the elastic plate, such that the elastic plate is deformed to be raising the hook for releasing the engagement between the hook and the electronic equipment, and to plug/unplug the connector to/from the electronic equipment. As the bracer is not forced to draw, the elastic plate would be influenced by its own elastic resilience to move the bump forward for the location of the hook to dipped, so that the engagement of the connector and the slot of the electronic equipment is accomplished, and detachment of the connector from the electronic equipment is avoided.

However, in plugging and unplugging the connector and the electronic equipment, the user has to pull the aforementioned bracer with one hand while hold the connector with the other hand. The plugging and unplugging action cannot be accomplished with a single hand. As such, it is inconvenient to use. Moreover, as the contact angle between the elastic plate and the bump is incorrect, the elastic resilience provided by the elastic plate cannot effect the movement of the bump. Accordingly, the hook cannot be dipped, and the engagement with the slot cannot be accomplished. As the bump cannot be moved such that the elastic plate is oppressed too long, a permanent deformation of the elastic plate is possible to reduce the service life of the connector.

Therefore, it is of interest by those skilled in the art to provide a connector easy for plugging and unplugging with long service life.

SUMMARY OF THE INVENTION

In view of various problems of the above prior art, mainly object of the invention is to provide a connector capable of accomplishing plugging and unplugging with an electronic equipment in a single hand press way.

Secondary object of the invention is to provide a connector having a fastener and a connector body thereof in integral pivot joint to address the problem of conventional connectors in which front hook cannot be dipped smoothly.

Another object of the invention is to provide a connector having a bracer provided to facilitate plugging and unplugging between the fastener and the electronic equipment.

To achieve above object and other object, the invention provides a connector, including a connector body, a fastener and an elastomer. The fastener is in pivot joint with the connector body, and two ends of the fastener are a hook end and a press end, respectively. Both of the hook end and the press end can be rotated in opposite directions synchronously with each other. Two ends of the elastomer contact the press end of the fastener and the connector body to accept support of the connector body, and provide elastic force to the press end of the fastener.

Preferably, the connector body may be provided with a stopper, which may be provided below the press end of the fastener to define rotary range of the two ends of the fastener. The fastener may be arranged in a pivot hole between the hook end and the press end for pivot joint of the fastener and the connector body. The connector body may be provided with a fixation portion and a guiding pillar. The fixation portion may fix one end of the elastomer to the connector body. The guiding pillar allows for passing through the elastomer in order to guide an extension direction of the elastomer.

Preferably, the connector of the invention further includes a bracer, the bracer having a force exertion end and a drawing end for contacting the fastener, the force exertion end being capable of being exerted with a force to move for the drawing end to exert a downward component force to the press end of the fastener so that the hook end of the fastener is drawn to rotate.

Furthermore, the location on which the bracer and the fastener are contacted being different from the location on which the fastener and the connector body are in pivot joint. The location of the bracer body corresponding to the elastomer would form a through hole for the elastomer to pass through the bracer via the through hole and contact with the press end. The body of the through hole has to extend and expand in the direction in which the force exertion end is forced to move, such that the forward and backward movement of the force exertion end would not be interfered by the elastomer, so that the drag of the bracer gets smoother.

Furthermore, the connector body may be formed with a guide groove or a guiding plane. a groove wall of the guide groove or the guiding plane is capable of guiding movement of the bracer. The connector body is provided with a locating portion facing a wall of the fastener for locating the fastener.

The invention further provides a connector for a fiber optic cable. The connector includes a connector body, a cover, a fastener and an elastomer. The connector body with a butting portion is protruded forward, having a butting hole and an internal space extended from the butting hole backward to contain an electrical circuit board. The cover is joined on a lateral side of the connector body for shielding the internal space of the connector body to reduce external interference impact on the operation of the electrical circuit board contained in the internal space, or the opportunity of outward signal escape. The fastener is in pivot joint with the cover through a hinge, two ends thereof being a hook end and a press end, both of the hook end and the press end being capable of rotation in opposite directions synchronously with reach other centered about the hinge. The elastomer below the press end of the fastener to be fixed by the connector body or the fastener.

Preferably, the internal space of the connector body is further provided with a fixation block for fixing the electrical circuit board. The connector body has a locating seat formed behind the internal space of the connector body, the locating seat is provided for locating a joint of the fiber optic cable. The connector body and the cover are joined by a fringe structure with mutually mated concave and convex. The cover may be formed with a locating hole for locating the electrical circuit board.

Furthermore, the hook end of the fastener comprises two hook arms and two hooks. The two hook arms may be extended toward the butting hole of the butting portion, and the front fringes are extended to form the two hooks, respectively. The two hook arms are extended in parallel, and the thickness dimensions of the cross sections of each of the hook arms and the hooks on the front fringes thereof are the same to increase bending resistance.

Compared to prior arts, the fastener of the connector in the invention is pivoted with the connector body, so that the fastener may rotate pivotally about the connector body by means of a single hand press way for a hook on front of the fastener may be raised or dipped appropriately to accomplish plugging and unplugging with the electronic equipment. The connector in the invention further provides an elastomer, which provides the elastic force on the press end, and maintains the stability of the engagement state of the hook end and the electronic equipment, in order to increase reliability of the connector in the invention.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
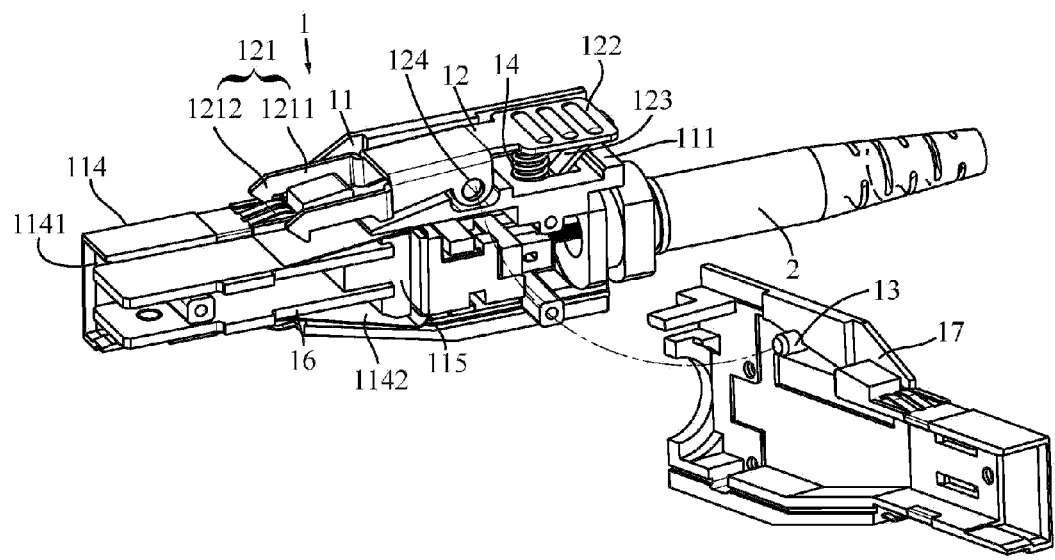
FIG. 1 is an exploded view showing partial components of the connector according to an implementation of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The invention improves structure of a connector. For the connector of the invention, plugging and unplugging with an electronic equipment may be accomplished in a press way to achieve a connector with miniaturized structure (e.g., Mini Serial Attached SCSI, Mini SAS). Refer to FIGS. 1 to 4, which are schematic views showing structure of the connector according to one implementation of the invention. As shown in the Figures disclosed above, the connector 1 of the invention may include a connector body 11, a fastener 12, an elastomer 14 and a cover 17. The connector body 11 may have a butting portion 114 protruded forward. The above butting portion 114 has a butting hole 1141 for butting the electronic equipment, and an internal space 1142 extended backward from the butting hole 1141. The internal space 1142 is for containing an electrical circuit board 16 for delivering signals, and other optical-electrical converter (not shown) for converting optical-electrical signals, but not limited thereto. The connector body 11 shown in FIG. 4 also has a locating seat 116 formed behind the internal space 1142. A seat of the locating seat 116 is provided concavely with a groove therein for locating a MPO joint 21 of a fiber optic cable 2. It is noted that any type of joint of the fiber optic cable 2 may be used for locating the locating seat 116 so long as the structural design fits the groove of the locating seat 116. The cover 17 is used for combining the connector body 11 to shield the internal space 1142, and accomplishing locating of various fiber optic cable joints in conjunction with the locating seat 116.

Additionally, the electrical circuit board 16 has an insertion portion 161 extending forward into the butting hole 1141. The insertion portion 161 is, for example, a gold finger for inserting the electronic equipment. The internal space 1142 of the connector body 11 is further provided convexly with a fixation block 115 for fixing the electrical circuit board 16, in order to maintain the location of the electrical circuit board 16 in the internal space 1142. In the invention, the fixation block 115 may also be used for fixing heat dissipation material to dissipate heat of the heat source in the internal space 1142 in order to increase the stability of connector operation.

Two ends of the fastener 12 are defined as a hook end 121 and a press end 122, respectively. The fastener 12 is formed a pivot hole 124 between the hook end 121 and the press end 122, so that the fastener 12 may be located by the hinge 13 penetrating through the pivot hole 124. The hinge 13 may be provided on one side of the cover 17 facing the internal space 1142. The hook end 121 is used for engaging an exposed slot of the electronic equipment, having the effect for locking the connector to the electronic equipment, for the insertion relationship between the connector and the electronic equipment to be insusceptible to external force, while maintaining good electrical connection between the connector and the electronic equipment. The hook end 121 shown in FIG. 1 comprises two hook arms 1211 and two hooks 1212. The two hook arms 1211 extend toward the butting hole 1141 of the butting portion 114, and the front fringes are extended to form the two hooks 1212, respectively.

In this implementation, two hook arms 1211 are extended in parallel. The height dimensions of the cross sections of each of the hook arms 1211 and the hooks 1212 on the front fringes thereof are much larger than the thickness dimensions, and the thickness dimensions of both cross sections are the same to increase bending resistance, in order to improve the entire structural strength, but the implementation of the connector structure of the invention is not limited thereto.

Figure 2:
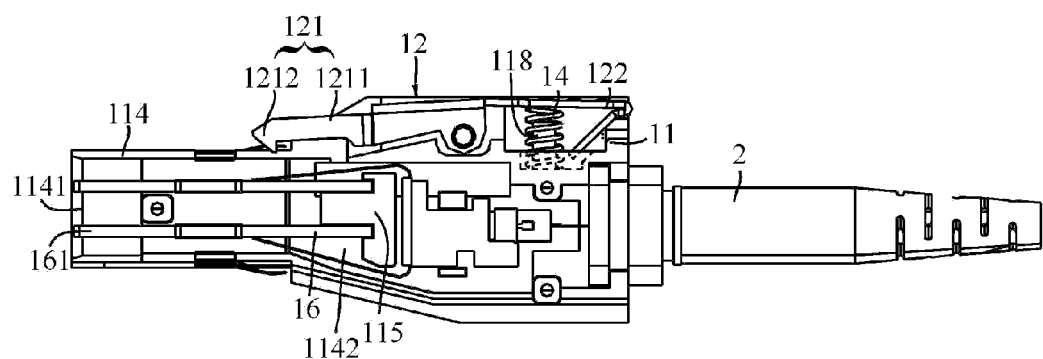
FIG. 2 is a state diagram showing the press end on the fastener of the connector shown in FIG. 1 without a pressing force received.
Figure 3:
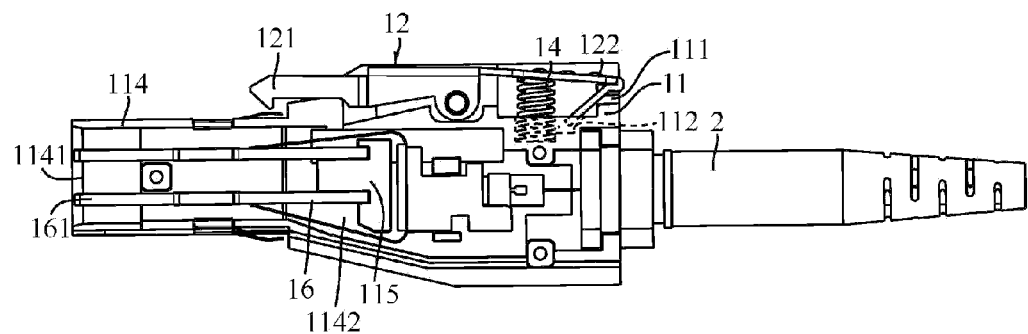
FIG. 3 is a state diagram showing the press end on the fastener of the connector shown in FIG. 1 with a pressing force received.
Figure 4:
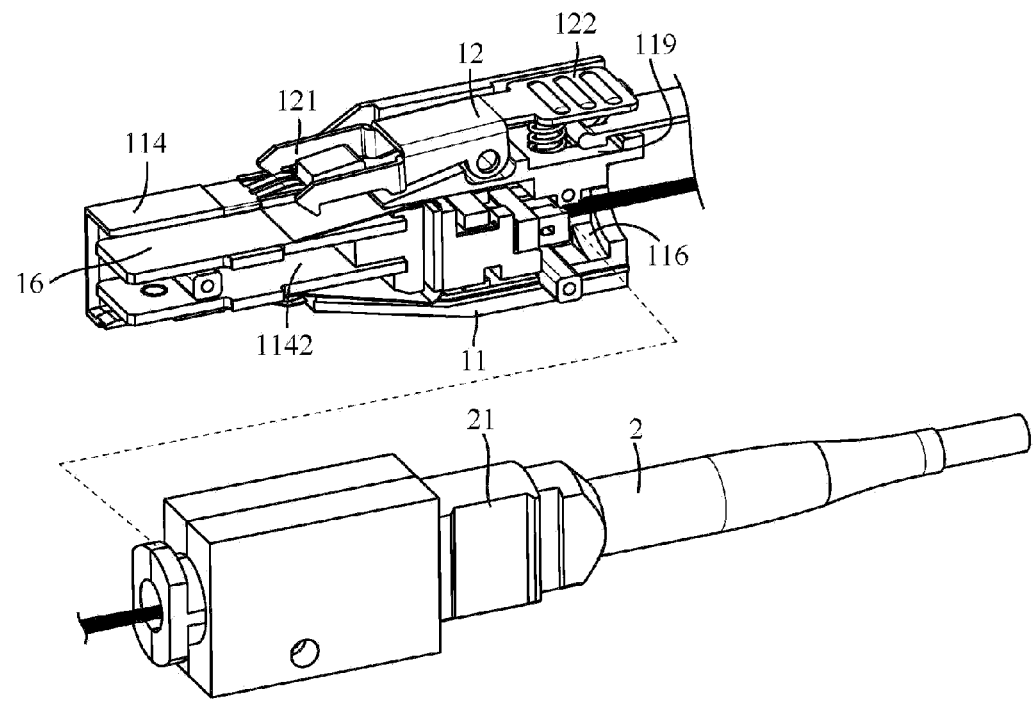
FIG. 4 is a schematic view showing that the connector according to the invention has a locating seat for locating a fiber optic cable in the form of MPO joint.
Figure 5:
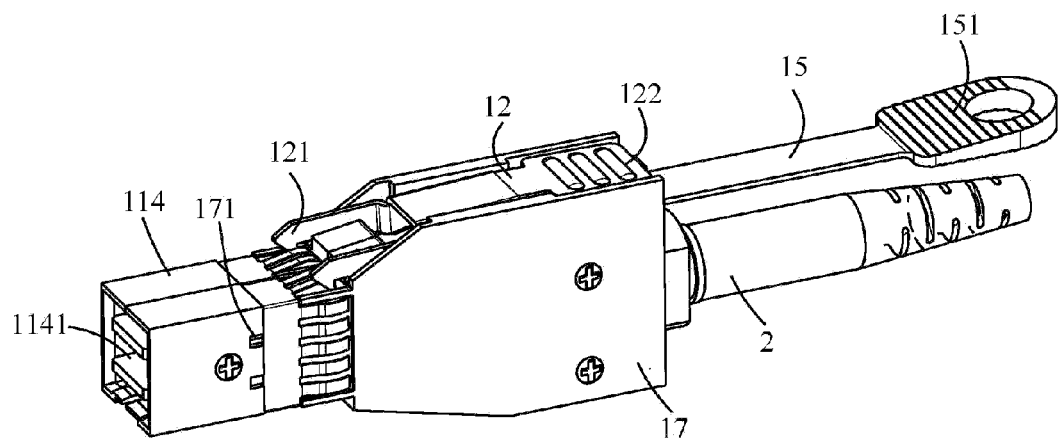
FIG. 5 is a stereogram showing the connector according to the invention.

In the invention, the hook end 121 and the press end 122 can both rotate around the hinge 13 synchronously in opposite directions. For example, as shown in FIG. 3, as the press end 122 is forced to move downward, the hook end 121 would rotate around the hinge 13 synchronously and is thus raised, such that the engagement with the electronic equipment is released. At the moment, the connector 1 may be unplugged from the electronic equipment with a single hand easily. In the contrary, as shown in FIG. 2, as the press end 122 is forced to move upward, the hook end 121 would move downward synchronously, such that the engagement of the hook end 121 and the electronic equipment is accomplished. It is noted additionally that the above elastomer 14 provides mainly upward elastic pushing force for the press end 122 in order for the press end 122 to move upward, and thereby maintaining the engagement state of the hook end and the electronic equipment.

As shown in FIG. 3, the connector body 11 is provided with a stopper 111. The stopper 111 is provided below the press end 122 of the fastener 12 to provide stop effect for downward movement of the press end 122 in order to define the movement range of the fastener 12. The arrangement of the stopper 111 may prevent the connector from damage due to excessive raising height of the hook end on the fastener.

The elastomer 14 is, for example, a spiral spring or leaf spring. The elastomer 14 may be selected to be fixed below the press end 122 of the fastener 12 by the connector body 11, such that two ends of the elastomer 14 may keep on contacting the connector body 11 and the press end 122, respectively. As such, the elastomer 14 may provide an elastic force for the press end 122 by the support from the connector body 11. As shown in FIG. 2, a location that the connector body 11 is connected to the elastomer 14 closely is provided concavely with a hole groove to form a fixation portion 112, and provide fixation for the elastomer 14 to fix one end of the elastomer 14 to the connector body 11. However, the structural form for the fixation portion of the invention is not limited to the hole groove. Other fixation structures may still be selected to achieve fixation of the elastomer. Also, the structural form of fastening may be used to achieve fixation of the elastomer. Additionally, for the elastomer 14, the connector body 11 may be formed with a guiding pillar 118 to guide the extension direction of the elastomer 14, for the elastomer 14 to keep on contacting the press end 122 of the fastener 12, and further provide the elastic force for the press end 122 to force the press end 122 to move upward or in a predetermined direction. Moreover, as the press end 122 does not receive a pressing force, the engagement state of the hook end 121 and the electronic equipment is maintained.

Also refer FIGS. 5 to 9, which show connector structure according to another implementation of the invention. The function for the connector in this implementation is roughly the same as the aforementioned implementation. Therefore, the same functions would not be repeated, but only different structures and functions are described in order for the features and advantages of this implementation to be better understood.

Figure 6:
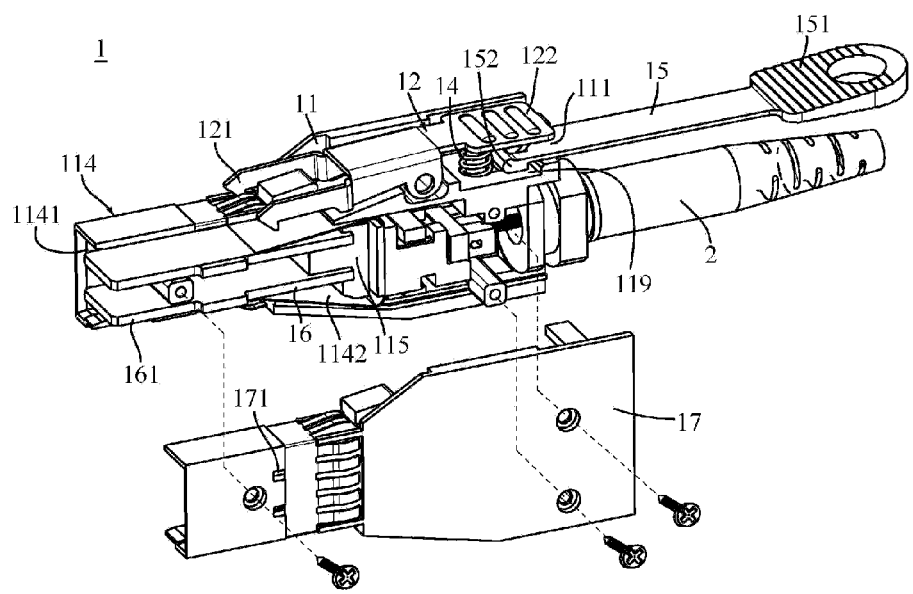
FIG. 6 is an exploded view showing disassembly of the cover from the connector body in the connector shown in FIG. 5.

As shown in FIG. 6, the connector 1 of this implementation for the fiber optic cable 2 has the connector body 11, the fastener 12 and the elastomer 14 as the aforementioned implementation, in addition to a bracer 15. The bracer 15 may be made of elastic or non-elastic material to facilitate the press end 122 of the fastener 12 to accomplish plugging and unplugging of the connector and the electronic equipment. Two ends of the bracer 15 may be a force exertion end 151 and a drawing end 152 for drawing the fastener 12 to move. In this implementation, the drawing end 152 is formed with a hole groove 153. Correspondingly, the fastener 12 is extended obliquely downward with a hooking portion 123 on one side of the press end 122. The hooking portion 123 may pass through the hole groove 153 and hook a groove wall of the drawing end 152, such that the engagement contact of the drawing end 152 and the fastener 12 is accomplished. As such, the force exertion end 151 of the bracer 15 moves backward as a pulling force is accepted, such that the movement of the hooking portion 123 is driven through the drawing end 152 synchronously. At this moment, the drawing end 152 may exert a downward component force to the hooking portion 123, for the hook end 121 to be raised in order to release the engagement state of the hook end 121 and the electronic equipment.

In operating the connector of this implementation, as the force exertion end 151 of the bracer 15 does not receive the pulling force, the elastomer 14 would provide the elastic force for the press end 122, and force the press end 122 to move upward, and thereby the hook end 121 is lowered. At this moment, the force exertion end 151 of the bracer 15 would move forward due to the drawing end 152 (the drawing end 152 would move forward in conjunction with the lowered hook end 121).

On the contrary, as the force exertion end 151 of the bracer 15 receives the pulling force, the drawing end 152 would move backward with the force exertion end 151 to exert a downward component force for the hooking portion 123, such that the press end 122 moves downward to raise the hook end 121. At this moment, the engagement of the hook end 121 and the electronic equipment may be released for plugging and unplugging the connector. Thus, the bracer can facilitate the press end of the fastener to accomplish the effect of plugging and unplugging the electronic equipment.

Figure 7:
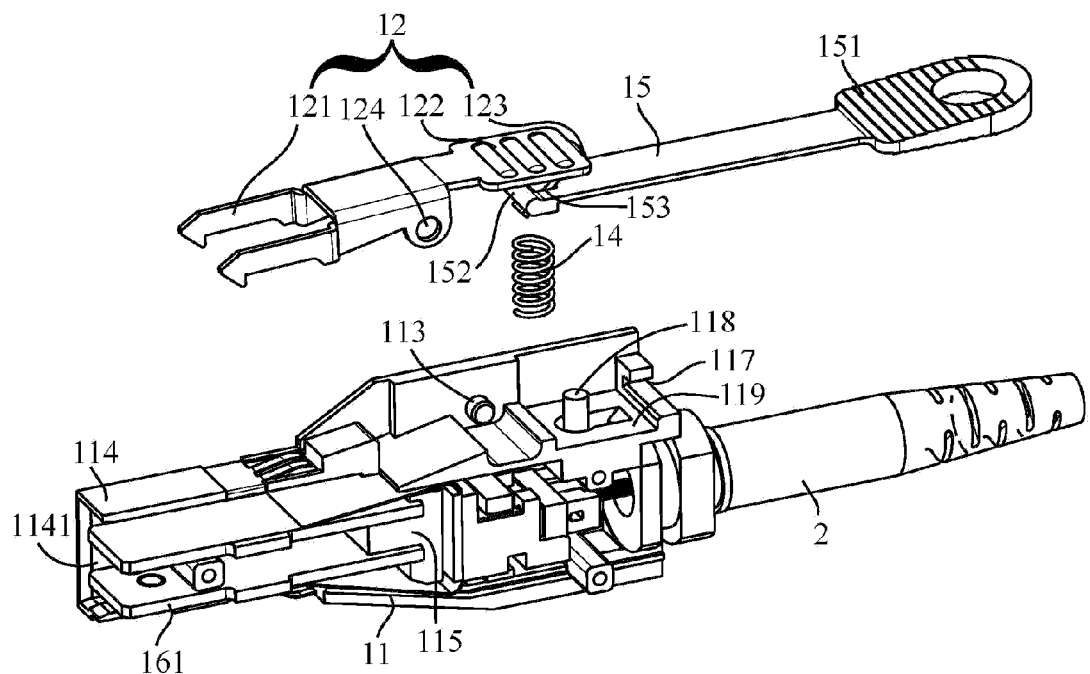
FIG. 7 is an exploded view showing disassembly of the fastener from the connector body in the connector shown in FIG. 5.
Figure 8:
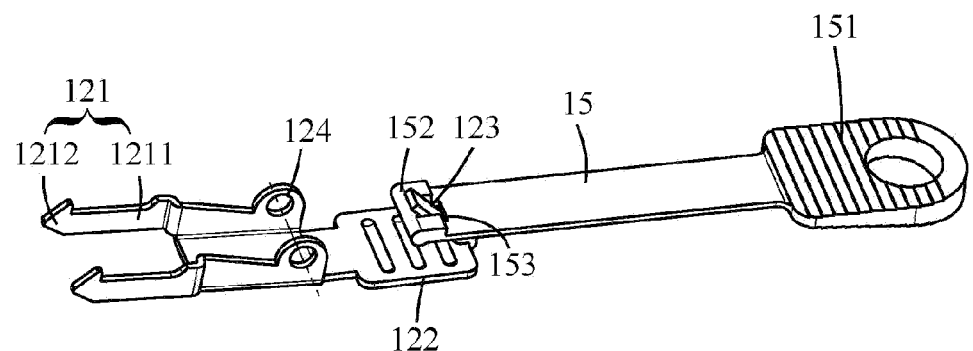
FIG. 8 is a state diagram showing fastening for the bracer and the fastener of the connector shown in FIG. 5.

Additionally, the connector body 11 may further be formed with a guide groove 117 and a guiding plane 119. The body of the bracer 15 may enter the guide groove 117 through an opening in the guide groove 117, in order to guide the drawing end 152 of the bracer 15 to move forward and backward on a horizontal movement plane by means of the groove wall inside the guide groove 117. The guiding plane 119 is used for contacting slidably the protruded portion on the drawing end 152 of the bracer 15, and has also the effect of guiding the drawing end 152 of the bracer 15 to move in a horizontal plane. The guiding plane 119 may also be formed to combining the cover 17 of the connector body 11. A wall inside the connector body 11 shown in FIG. 7 is further arranged with a locating portion 113, which is for penetrating the fastener 12 to provide initial locating as the fastener 12 is assembled. The locating portion 113 may be a component in the form of a hinge.

Figure 9:
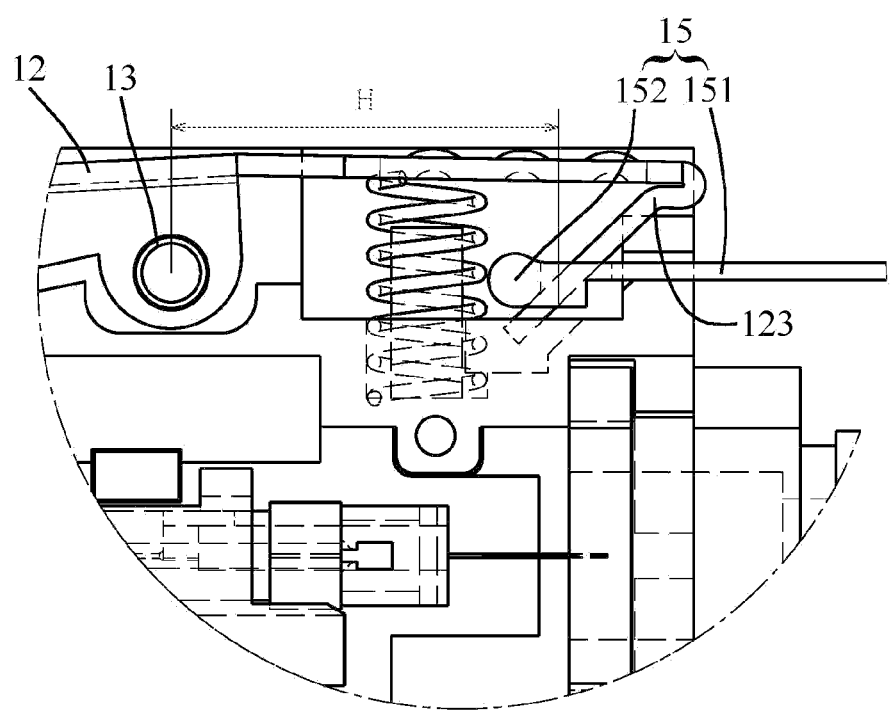
FIG. 9 is a schematic view showing actuation of the bracer and the fastener according to one example of the invention.

Further refer to FIG. 9, which is a schematic view showing the actuation of the bracer and the fastener of the invention. The location at which the bracer 15 and the fastener 12 is contacted is separated from the location of the hinge 13 by a distance marked as H. The distance H forms a force exertion radius with which the fastener 12 rotates about the hinge 13 as a fulcrum by the drawing end 152 of the bracer 15. It is noted that if the bracer is extended beyond the location of the elastomer, then the location of the bracer body corresponding to the elastomer would form a through hole for the elastomer to pass through the bracer via the through hole and contact with the press end. The hole body of the aforementioned through hole has to extend and expand in the direction in which the force exertion end is forced to move, such that the forward and backward movement of the force exertion end would not be interfered by the elastomer, so that the drag of the bracer gets smoother.

The cover 17 is joined on a lateral side of the connector body 11 for shielding the internal space 1142 of the connector body 11 to reduce external interference impact on the operation of the electrical circuit board 16 contained in the internal space 1142, or the opportunity of outward signal escape. In order to increase shielding effect of the cover 17, the connector body 11 and the cover 17 are joined in a form with mutually mated concave and convex to reduce the opportunity that circuit signals on the electrical circuit board 16 escape outward or are interfered externally. Moreover, the cover 17 is also formed with a locating hole 171 for locating the electrical circuit board 16. The locating hole 171 is not a necessary component in the connector of the invention.

In summary, the connector of the invention has at least the following technical structure characteristics:

1. The press end is arranged such that plugging and unplugging of the connector may be accomplished in a single hand press way under the situation without bracer arrangement.

2. The elastomer is provided for the press end such that the elastic force may be provided as the press end does not receive a pressing force to drive the press end to move upward, while maintain the engagement state of the hook end and the electronic equipment.

3. The bracer is also provided to facilitate the press end of the fastener, such that plugging and unplugging of the connector is accomplished as the press end malfunctions.

4. The locating seat is provided for locating fiber optic cables with various types of joints so that the purpose of the connector is more diversified.

5. The fastener is in pivot joint with the connector body to rotate pivotally relative to the connector body for the hook on front of the fastener to be raised or dipped appropriately.

6. The height of various cross sections of the hook arms of the fastener and the hooks on the front fringes thereof is much larger than the thickness, and the thickness of each cross section is the same, such that the entire structural strength is increased and the service life of the connector is thus prolonged.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A connector for plugging and unplugging with an electronic device, including:
   a connector body having a butting portion protruded forward, an internal space extended backward from a butting hole of the butting portion for containing an electrical circuit board, and a locating set formed behind the internal space for locating a joint of a cable, wherein the butting hole is for butting the electronic device, the electrical circuit board has a gold finger extending forward into the butting hole for inserting the electronic device, and a fixation block is provided in the internal space for fixing the electrical circuit board;
   a cover used for combining the connector body to shield the internal space and accomplishing locating of the joint in conjunction with the locating seat;
   a fastener in pivot joint with the connector body with a hook end and a press end on two ends, respectively;
   an elastomer with two ends contacting the connector body and the press end of the fastener, respectively;
   a bracer having a force exertion end and a drawing end, wherein a hooking portion is extended downward obliquely from an end edge of the press end for inserting through the drawing end of the bracer, and the force exertion end is capable of being exerted with a force to move for the drawing end to exert a downward component force to the hooking portion directly or the force is exerted on the press end directly so that the hook end of the fastener is drawn to rotate.

2. The connector of claim 1, wherein the connector body is provided with a stopper, which is provided below the press end of the fastener to define a rotary range of the fastener, and the fastener is arranged with a pivot hole between the hook end and the press end for pivot joint of the fastener and the connector body.

3. The connector of claim 1, wherein the connector body is provided with a fixation portion and a guiding pillar, the fixation portion is used to fix one end of the elastomer to the connector body; and the guiding pillar is for passing through the elastomer in order to guide an extension direction of the elastomer.

4. The connector of claim 1, wherein the location on which the bracer and the fastener are contacted is different from the location on which the fastener and the connector body are in pivot joint.

5. The connector of claim 1, wherein the connector body is formed with a guide groove and a guiding plane, a groove wall of the guide groove is capable of guiding movement of the bracer, and the bracer enters the guide groove through an opening in the guide groove, in order to guide the drawing end of the bracer to move forward and backward on a horizontal movement plane by means of the groove wall; the guiding plane is used for contacting slidably a protruded portion on the drawing end of the bracer, and also guiding the drawing end of the bracer to move in the horizontal movement plane; the guiding plane is formed to combining the cover, and the connector body is provided with a locating portion facing a wall of the fastener for locating the fastener.

6. A connector for plugging and unplugging a fiber optic cable with an electronic device, including:
   a connector body with a butting portion protruded forward, the butting portion having a butting hole, and an internal space extended from the butting hole backward to contain an electrical circuit board, wherein the butting hole is for butting the electronic device, and the electrical circuit board has a gold finger extending forward into the butting hole for inserting the electronic device;
   a cover joined on a lateral side of the connector body for shielding the internal space of the connector body;
   a fastener in pivot joint with the cover through a hinge, two ends thereof being a hook end and a press end, both of the hook end and the press end being capable of rotation in opposite directions synchronously with each other centered about the hinge;
   an elastomer below the press end of the fastener to be fixed by the connector body or the fastener;

a bracer having a force exertion end and a drawing end, wherein a hooking portion is extended downward obliquely from an end edge of the press end for inserting through the drawing end of the bracer, and the force exertion end is capable of being exerted with a force to move for the drawing end to exert a downward component force to the hooking portion directly or the force is exerted on the press end directly so that the hook end of the fastener is drawn to rotate.

7. The connector of claim 6, wherein the internal space of the connector body is further provided with a fixation block for fixing the electrical circuit board; and the hinge is arranged on the cover integrally.

8. The connector of claim 6, wherein the connector body has a locating seat formed behind the internal space of the connector body, and the locating seat is provided for locating a joint of the fiber optic cable.

9. The connector of claim 6, wherein the connector body and the cover are joined by a fringe structure with mutually mated concave and convex parts; and the cover is formed with a locating hole for locating the electrical circuit board.

10. The connector of claim 6, wherein the hook end of the fastener comprises two hook arms and two hooks, the two hook arms extended toward the butting hole of the butting portion, and the front fringes are extended to form the two hooks, respectively; and wherein the two hook arms are extended in parallel, and thickness dimensions of a cross section of each hook arm and each hook on the front fringes thereof are the same to increase bending resistance.

11. The connector of claim 6, wherein the connector body is formed with a guide groove and a guiding plane, a groove wall of the guide groove is capable of guiding movement of the bracer, and the bracer enters the guide groove through an opening in the guide groove, in order to guide the drawing end of the bracer to move forward and backward on a horizontal movement plane by means of the groove wall; the guiding plane is used for contacting slidably a protruded portion on the drawing end of the bracer, and also guiding the drawing end of the bracer to move in the horizontal movement plane; the guiding plane is formed to combining the cover, and the connector body is provided with a locating portion facing a wall of the fastener for locating the fastener.

* * * * *